(12) United States Patent
Kimba Dit Adamou et al.

(10) Patent No.: US 11,805,531 B2
(45) Date of Patent: Oct. 31, 2023

(54) RESOURCE ALLOCATION METHOD, NODE, AND STORAGE MEDIUM

(71) Applicant: VIVO MOBILE COMMUNICATION CO., LTD., Guangdong (CN)

(72) Inventors: Boubacar Kimba Dit Adamou, Chang'an Dongguan (CN); Xiaodong Shen, Chang'an Dongguan (CN); Wei Bao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 114 days.

(21) Appl. No.: 17/129,429

(22) Filed: Dec. 21, 2020

(65) Prior Publication Data

US 2021/0112546 A1    Apr. 15, 2021

Related U.S. Application Data

(63) Continuation of application No. PCT/CN2019/092030, filed on Jun. 20, 2019.

(30) Foreign Application Priority Data

Jun. 21, 2018  (CN) .......................... 201810645638.9

(51) Int. Cl.
*H04W 72/27*    (2023.01)
*H04W 72/0453*  (2023.01)
(Continued)

(52) U.S. Cl.
CPC ....... *H04W 72/27* (2023.01); *H04W 72/0453* (2013.01); *H04W 72/21* (2023.01); *H04W 72/23* (2023.01)

(58) Field of Classification Search
CPC ......... H04W 72/0426; H04W 72/0413; H04W 72/042; H04W 72/0453; H04W 72/0406; H04B 7/15542
See application file for complete search history.

(56) References Cited

U.S. PATENT DOCUMENTS 10,700,775 B2 *   6/2020   Novlan .............. H04B 7/15592
11,283,517 B2 *   3/2022   Novlan .............. H04B 7/15542
(Continued)

FOREIGN PATENT DOCUMENTS

CN   101212757 A   7/2008
CN   103597893 A   2/2014
(Continued)

OTHER PUBLICATIONS

EP Search Report in Application No. 19823167.2 dated Jul. 8, 2021.
(Continued)

*Primary Examiner* — Brian T O Connor
(74) *Attorney, Agent, or Firm* — Maschoff Brennan (57) ABSTRACT

A resource allocation method, a node, and a storage medium are provided. The method includes: configuring or reserving, by a first parent node, a first communication resource for a subnode; and sending, by the first parent node, to a second parent node, resource indication information used to indicate the first communication resource, where the resource indication information is used to enable the second parent node to configure or reserve a second communication resource for the subnode according to the first communication resource.

11 Claims, 4 Drawing Sheets

(51) Int. Cl.
*H04W 72/21* (2023.01)
*H04W 72/23* (2023.01)

(56) References Cited

U.S. PATENT DOCUMENTS

| | | | |
|---|---|---|---|
| 11,451,356 B2* | 9/2022 | Liu | H04W 72/0446 |
| 11,690,080 B2* | 6/2023 | Liu | H04W 72/27 370/329 |
| 2014/0133387 A1 | 5/2014 | Wagner et al. | |
| 2015/0117183 A1 | 4/2015 | Heo et al. | |
| 2016/0295565 A1 | 10/2016 | Kim et al. | |
| 2017/0064731 A1 | 3/2017 | Wang et al. | |
| 2019/0246378 A1* | 8/2019 | Islam | H04W 72/12 |
| 2019/0313269 A1* | 10/2019 | Keskitalo | H04B 7/00 |
| 2019/0335337 A1* | 10/2019 | Damnjanovic | H04L 5/0032 |
| 2019/0349079 A1* | 11/2019 | Novlan | H04W 72/0446 |

FOREIGN PATENT DOCUMENTS

| | | |
|---|---|---|
| CN | 105594140 A | 5/2016 |
| CN | 105992291 A | 10/2016 |
| CN | 107493160 A | 12/2017 |
| EP | 2 242 298 A1 | 10/2010 |
| EP | 2 493 092 A2 | 8/2012 |
| WO | 2011038528 A1 | 4/2011 |

OTHER PUBLICATIONS

"Physical Layer enhancement on IAB" 3GPP TSG RAN WG1 Meeting #92bis, Huawei, HiSilicon, R1-1803695, Apr. 16, 2018.
"Discussion on NR enhancements to support IAB" 3GPP TSG RAN WG1 Meeting #93, Sony, R1-1806572, May 21, 2018.
CN Office Action in Application No. 201810645638.9 dated Aug. 31, 2020.
CN Search Report in Application No. 201810645638.9 dated Mar. 11, 2020.
"Summary of 7.7.1 Enhancements to support NR backhaul links", AT&T, 3GP TSG RAN WG1 Meeting #93, R1-1807769, May 21, 2018.
Written Opinion and International Search Report in Application No. PCT/CN2019/092030 dated Dec. 30, 2020.

* cited by examiner

RESOURCE ALLOCATION METHOD, NODE, AND STORAGE MEDIUM

CROSS REFERENCE TO RELATED APPLICATIONS

This application is a continuation application of PCT International Application No. PCT/CN2019/092030 filed on Jun. 20, 2019, which claims priority to Chinese Patent Application No. 201810645638.9 filed on Jun. 21, 2018 in China, both disclosures of which are incorporated herein by reference in their entireties.

TECHNICAL FIELD

The present disclosure relates to the field of communications technologies, and in particular, to a resource allocation method, a node, and a storage medium.

BACKGROUND

In a relay technology, one or more relay nodes are added between a base station and a terminal, so that a radio signal is transmitted between the base station and the terminal by being forwarded once or for a plurality of times. For example, if a direct link between the base station and the terminal has relatively poor communication quality, the relay technology may be used to replace the direct link between the base station and the terminal with a plurality of links having relatively desirable communication quality, to improve communication quality. The plurality of links having relatively desirable communication quality may include a link between the base station and a relay node and a link between a relay node and the terminal, and may further include a link between relay nodes.

As communications technologies are developed rapidly, communication networks have increasingly high bands. Higher bands of communication networks require shorter backhaul distances of radio signals. This indicates that relay nodes are deployed more densely. Radio signals transmitted by a plurality of relay nodes deployed densely may interfere with each other. As a result, communication quality is deteriorated.

SUMMARY

Embodiments of the present disclosure provide a resource allocation method, a node, and a storage medium, to resolve a problem of deteriorated communication quality.

According to a first aspect, an embodiment of the present disclosure provides a resource allocation method. The method includes: configuring or reserving, by a first parent node, a first communication resource for a subnode; and sending, by the first parent node to a second parent node, resource indication information used to indicate the first communication resource, where the resource indication information is used to enable the second parent node to configure or reserve a second communication resource for the subnode according to the first communication resource.

According to a second aspect, an embodiment of the present disclosure provides a resource allocation method. The method includes: receiving, by a second parent node from a first parent node or a subnode, resource indication information used to indicate a first communication resource, and determining, according to the resource indication information, a first communication resource configured or reserved by the first parent node for the subnode; and configuring or reserving, by the second parent node, a second communication resource for the subnode according to the first communication resource.

According to a third aspect, an embodiment of the present disclosure provides a resource allocation method. The method includes: sending, by a subnode to a second parent node, resource indication information used to indicate a first communication resource, where the resource indication information is used to enable the second parent node to configure or reserve a second communication resource for the subnode according to the first communication resource, where the first communication resource is configured or reserved by a first parent node for the subnode; and accessing, by the subnode, the second parent node.

According to a fourth aspect, an embodiment of the present disclosure provides a parent node. The parent node includes: an allocation module, configured to configure or reserve a first communication resource for a subnode; and a sending module, configured to send, to another parent node, resource indication information used to indicate the first communication resource, where the resource indication information is used to enable the another parent node to configure or reserve a second communication resource for the subnode according to the first communication resource.

According to a fifth aspect, an embodiment of the present disclosure provides a parent node. The parent node includes: a receiving module, configured to receive, from another parent node or a subnode, resource indication information used to indicate a first communication resource; a determining module, configured to: determine, according to the resource indication information, a first communication resource configured or reserved by the another parent node for the subnode; and an allocation module, configured to configure or reserve a second communication resource for the subnode according to the first communication resource.

According to a sixth aspect, an embodiment of the present disclosure provides a subnode. The subnode includes: a sending module, configured to send, to a second parent node, resource indication information used to indicate a first communication resource, where the resource indication information is used to enable the second parent node to configure or reserve a second communication resource for the subnode according to the first communication resource, where the first communication resource is configured or reserved by a first parent node for the subnode; and an access module, configured to access the second parent node.

According to a seventh aspect, an embodiment of the present disclosure provides a parent node, including a processor and a memory, where the memory stores a computer program, and when the computer program is executed by the processor, the resource allocation method in the solution according to the first aspect is implemented.

According to an eighth aspect, an embodiment of the present disclosure provides a parent node, including a processor and a memory, where the memory stores a computer program, and when the computer program is executed by the processor, the resource allocation method in the solution according to the second aspect is implemented.

According to a ninth aspect, an embodiment of the present disclosure provides a subnode, including a processor and a memory, where the memory stores a computer program, and when the computer program is executed by the processor, the resource allocation method in the solution according to the third aspect is implemented.

According to a tenth aspect, an embodiment of the present disclosure provides a computer readable storage medium, where the computer readable storage medium stores a computer program, and when the computer program is executed by a processor, the resource allocation method in the solution according to the first aspect is implemented.

According to an eleventh aspect, an embodiment of the present disclosure provides a computer readable storage medium, where the computer readable storage medium stores a computer program, and when the computer program is executed by a processor, the resource allocation method in the solution according to the second aspect is implemented.

According to a twelfth aspect, an embodiment of the present disclosure provides a computer readable storage medium, where the computer readable storage medium stores a computer program, and when the computer program is executed by a processor, the resource allocation method in the solution according to the third aspect is implemented.

The embodiments of the present disclosure provide the resource allocation method, the node, and the storage medium. After the first parent node configures the first communication resource for the subnode, the resource indication information is used to notify the second parent node of the first communication resource configured by the first parent node for the subnode, so that the second parent node configures the second communication resource for the subnode by considering the first communication resource, to reduce interference between radio signals transmitted by a plurality of nodes, thereby improving communication quality.

BRIEF DESCRIPTION OF DRAWINGS

It may be better understood from the following descriptions of specific implementations of the present disclosure with reference to the accompanying drawings that same or similar reference numerals represent same or similar features in the present disclosure.

DESCRIPTION OF EMBODIMENTS

Characteristics and exemplary embodiments of various aspects of the present disclosure are described below in detail. In the following detailed descriptions, many specific details are provided to thoroughly understand the present disclosure. However, it is very clear to a person skilled in the art that the present disclosure can be implemented without some of these specific details. The following descriptions of the embodiments merely intend to provide embodiments of the present disclosure to better understand the present disclosure. The present disclosure is not limited to any specific configuration and algorithm provided below, and instead covers any modification, replacement, and improvement of an element, a component, and an algorithm without departing from the spirit of the present disclosure. In the accompanying drawings and the following descriptions, a well-known structure and technology are not shown to avoid unnecessary ambiguity of the present disclosure.

In a process of communication between a base station and a terminal, a signal transmitted between the base station and the terminal usually needs to be forwarded for a plurality of times between the base station and the terminal, to implement the communication between the base station and the terminal. A plurality of relay nodes may be disposed between the base station and the terminal, and the signal transmitted between the base station and the terminal may be forwarded by the relay node. In the embodiments of the present disclosure, the base station, the relay node, and the terminal may all be considered as nodes in a network. Communication between nodes may be wired communication or wireless communication. This is not limited herein.

The relay node may be a common relay node or a relay node with an integrated access and backhaul (IAB) function. This is not limited herein.

The base station may be a common base station, or an evolved NodeB (eNB), or a device such as a network side device (for example, a next generation base station (gNB) or a transmission and reception point (TRP)) or a cell in a 5G system, or a network side device in a subsequent evolved communications system. This is not limited herein. The base station may also be considered as a donor relay node, for example, the base station may also be a base station with a donor integrated access and backhaul (DIAB) function. The base station may be an integrated base station, or may be a base station including a centralized unit (CU) and a distributed unit (DU). The node may also be a DU in a base station.

The terminal may be a mobile phone, a tablet computer, a smart watch, a smart appliance, or the like. This is not limited herein.

Figure 1:
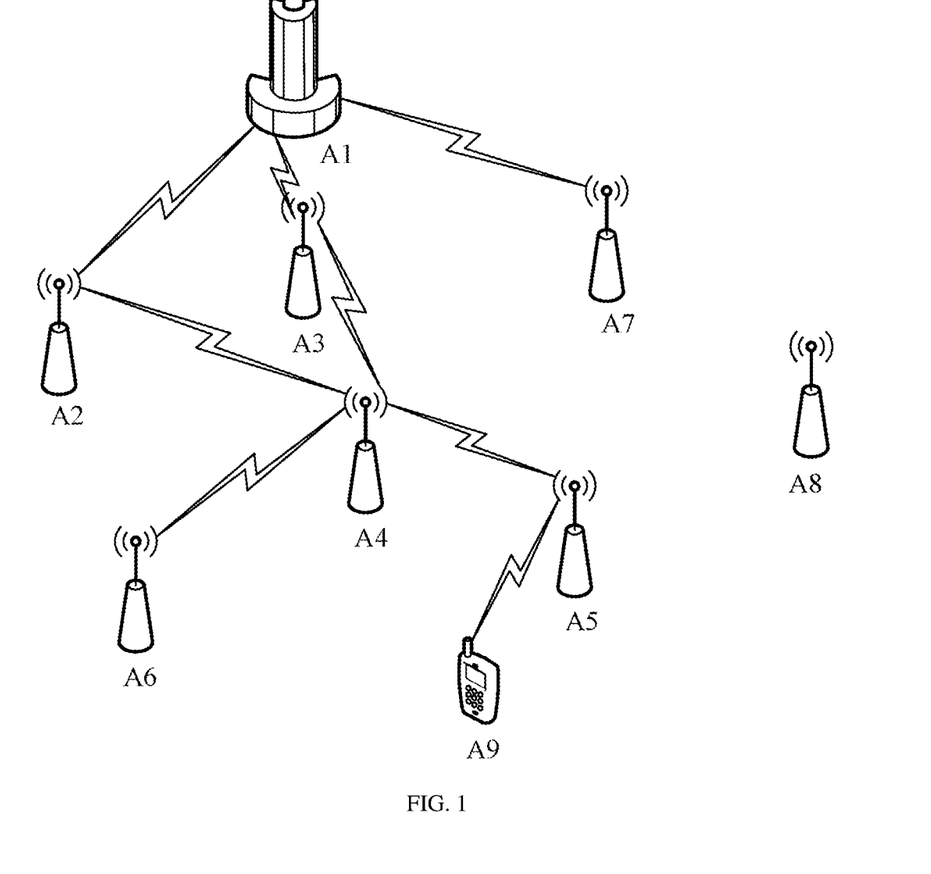
FIG. 1 is a schematic diagram of an application scenario according to an embodiment of the present disclosure.

FIG. 1 is a schematic diagram of an application scenario according to an embodiment of the present disclosure. As shown in FIG. 1, a communication network includes a node A1 to a node A9. The node A1 is a donor base station. The node A2 to the node A8 are all relay nodes. The node A9 is a terminal. As can be seen from FIG. 1, on a signal link, a signal sent by a base station A1 reaches a terminal A9 by sequentially passing through the relay nodes A3, A4, and A5. On another signal link, a signal sent by the base station A1 reaches the relay node A6 by sequentially passing through the relay node A2 and the relay node A4.

In the communication network, a node other than the base station and the terminal may be used as a parent node or may be used as a subnode. In other words, the node in communication network other than the base station and the terminal has a bi-directional configuration. Whether a node is used as a parent node or a subnode may be determined according to a specific working scenario and a specific working requirement. For example, the communication network includes five nodes: the node A1 to the node A5. The node A2 configures a communication resource for the node A3, and the node A3 configures a communication resource for the node A4. Therefore, for the node A2 and the node A3, the node A2 is a parent node and the node A3 is a subnode; and for the node A3 and the node A4, the node A3 is a parent node and the node A4 is a subnode. As can be seen, the node A3 in the communication network may be both a parent node and a subnode.

It should be noted that a node other than the base station may be selected as a subnode, and on a signal link of the subnode, a node that is between the subnode and the base station and that is connected to the subnode is a parent node of the subnode. The subnode sends data to the parent node, that is, uplink transmission; and the parent node sends data to the subnode, that is, downlink transmission.

The base station may serve as a parent node, the terminal may serve as a subnode, and the relay node may serve as both a parent node and a subnode. As shown in FIG. 1, assuming that the relay node A4 is a subnode, a parent node of the relay node A4 is the relay node A2 and the relay node A3. In other words, both the relay node A2 and the relay node A3 may communicate with the relay node A4. If the relay node A3 communicates with the relay node A4 at a moment at which the relay node A2 communicates with the relay node A4, a signal in communication between the relay node A2 and the relay node A4 interferes with a signal in communication between the relay node A3 and the relay node A4.

In the embodiments of the present disclosure, to avoid interference between signals in communication between a plurality of parent nodes and a same subnode, one of the parent nodes configures a time resource for the subnode, and may notify another parent node of the time resource already configured for the subnode. In this way, when configuring a time resource, the another parent node can avoid the already configured time resource. Therefore, time resources configured by the plurality of parent nodes for the same subnode to transmit a signal do not overlap each other.

The following describes an example in which one subnode accesses two parent nodes. The two parent nodes are a first parent node and a second parent node.

Figure 2:
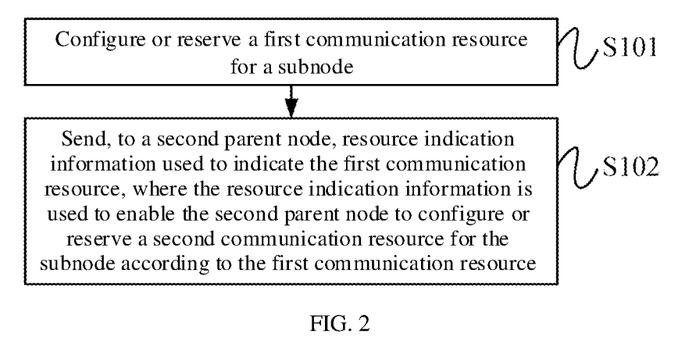
FIG. 2 is a flowchart of a resource allocation method according to an embodiment of the present disclosure.

FIG. 2 is a flowchart of a resource allocation method according to an embodiment of the present disclosure. The resource allocation method is performed by a first parent node. As shown in FIG. 2, the resource allocation method may include step S101 and step S102.

Step S101. Configure or reserve a first communication resource for a subnode.

The first parent node is an uplink node of the subnode. The first communication resource configured or reserved by the first parent node for the subnode is a communication resource occupied for communication between the first parent node and the subnode.

Step S102. Send, to a second parent node, resource indication information used to indicate the first communication resource, where the resource indication information is used to enable the second parent node to configure or reserve a second communication resource for the subnode according to the first communication resource.

The second parent node is an uplink node of the subnode. The second communication resource configured or reserved by the second parent node for the subnode is a communication resource occupied for communication between the second parent node and the subnode.

Both the first communication resource and the second communication resource are communication resources. The communication resource is a resource used by the subnode for communication. To reduce interference in communication between the first parent node and subnode and communication between the second parent node and the subnode, the first parent node sends the resource indication information to the second parent node, so that the second parent node configures or reserves the second communication resource for the subnode by considering he first parent node.

In this embodiment of the present disclosure, after configuring or reserving the first communication resource for the subnode, the first parent node notifies the second parent node of the first communication resource by using the resource indication information, so that the second parent node configures or reserves the second communication resource for the subnode by considering the first communication resource. Therefore, this reduces interference between radio signals transmitted by a plurality of nodes, thereby improving communication quality.

In some embodiments, the first communication resource and the second communication resource may both include a time resource, and/or the first communication resource and the second communication resource may both include a band resource.

The time resource is a time occupied by the subnode to transmit data. The subnode transmits, within the time resource configured by the first parent node, data exchanged with the first parent node. For example, in a scenario in which a node uses a time division duplexing (TDD) technology, the parent node needs to configure a time resource for the subnode.

The band resource is a band occupied by the subnode to transmit data. The subnode transmits, within the band resource configured by the first parent node, data exchanged with the first parent node. For example, in a scenario in which a node uses a frequency division duplexing (FDD) technology, the parent node needs to configure a band resource for the subnode.

In some embodiments, the subnode is a relay node. The time resource can include a backhaul time resource. The backhaul time resource is a time resource for backhaul transmission. That is, the subnode sends data to the parent node or the subnode receives data from the parent node within a time indicated by the backhaul time resource. If the backhaul time resource is configured by the first parent node for the subnode, that is, the first communication resource includes the backhaul time resource, the subnode sends data to the first parent node or the subnode receives data from the first parent node within the time indicated by the backhaul time resource.

The backhaul time resource may include an uplink backhaul time resource and a downlink backhaul time resource within a time window. The uplink backhaul time resource is a time resource for uplink backhaul transmission. The downlink backhaul time resource is a time resource for downlink backhaul transmission. The time window may be a period of time with predetermined duration. Within the time window, various tasks may be performed. In this embodiment of the present disclosure, the uplink backhaul time resource and the downlink backhaul time resource may be set in the time window. For example, the time window is a period of 20 minutes. In this time window, the zeroth minute to the fifth minute are the uplink backhaul time resource, and the tenth minute to the fifteenth minute are the downlink backhaul time resource.

In some embodiments, before a preset time period that is before a time resource configured by the first parent node for the subnode comes, the first parent node may send the resource indication information to the second parent node. This reduces or avoids the impact of a backhaul delay or an internal processing delay of the subnode. The backhaul delay may be evaluated by the parent node and/or the subnode. The internal processing delay of the subnode may be evaluated by the subnode.

The preset time period may be set according to a specific working scenario or a specific working requirement, for example, may be set to N slots or N symbols. This is not limited herein.

In some other embodiments, the subnode may be a terminal. The time resource may include an access time resource. The access time resource is a time resource for access of an access link of the parent node and the terminal. That is, the terminal sends data to the parent node or the terminal receives data from the parent node within a time indicated by the access time resource. If the access time resource is configured by the first parent node for the subnode, the subnode sends data to the first parent node or the subnode receives data from the first parent node within the time indicated by the access time resource.

The access time resource may include an uplink access time resource and a downlink access time resource within a time window. The uplink access time resource is a time resource for uplink access transmission. The downlink access time resource is a time resource for downlink access transmission. In this embodiment of the present disclosure, the uplink access time resource and the downlink access time resource may be set within the time window. For example, the time window is a period of 10 minutes. In this time window, the first minute to the fourth minute is the uplink access time resource, and the sixth minute to the ninth minute are the downlink access time resource.

In some embodiments, the uplink access time resource and the downlink access time resource may be non-backhaul time resources within the time window. That is, an intersection set of the access time resource and the backhaul time resource in a same time window is an empty set. That is, the access time resources and the backhaul time resource do not overlap each other in the same time window. An intersection set of the uplink access time resource and the downlink access time resource is an empty set. That is, only an uplink service or a downlink service can be performed at a same moment, and the uplink service and downlink services cannot be performed at a same moment.

In some embodiments, an intersection set of the first communication resource and the second communication resource is an empty set. Alternatively, there is no interference between the first communication resource and the second communication resource. That is, the first parent node sends the resource indication information to the second parent node, and the second parent node configures or reserves the second communication resource other than the first communication resource for the subnode. Therefore, this avoids interference between signals transmitted by a plurality of nodes, thereby improving communication quality. Moreover, this can also avoid transmission congestion in the node, thereby improving communication quality.

In some embodiments, the first communication resource and the second communication resource both include a time resource. In this case, an intersection set of a time resource configured or reserved by the second parent node for the subnode and a time resource configured or reserved by the first parent node for the subnode is an empty set. That is, a time indicated by the time resource configured by the second parent node for the subnode does not overlap a time indicated by the time resource configured by the first parent node for the subnode. Alternatively, there is no interference between the time resource configured or reserved by the second parent node for the subnode and the time resource configured or reserved by the first parent node for the subnode.

For example, if the time indicated by the time resource configured or reserved by the first parent node for the subnode is the zeroth minute to the fifth minute in the time window, the time indicated by the time resource configured or reserved by the second parent node for the subnode needs to avoid the zeroth minute to the fifth minute in the time window. For example, the time indicated by the time resource configured by the second parent node for the subnode may be from the eighth minute to the thirteenth minute.

In some other embodiments, the first communication resource and the second communication resource both include a band resource. In this case, an intersection set of a band resource configured or reserved by the second parent node for the subnode and a band resource configured or reserved by the first parent node for the subnode is an empty set. That is, a band indicated by the band resource configured by the second parent node for the subnode does not overlap a band indicated by the band resource configured by the first parent node for the subnode. Alternatively, there is no interference between the band resource configured or reserved by the second parent node for the subnode and the band resource configured or reserved by the first parent node for the subnode.

For example, if the band indicated by the band resource configured by the first parent node for the subnode is from 1920 MHz to 1980 MHz, the band indicated by the band resource configured by the second parent node for the subnode needs to avoid the band from 920 MHz to 1980 MHz. For example, the band indicated by the band resource configured by the second parent node for the subnode may be from 1710 MHz to 1785 MHz.

In this embodiment of the present disclosure, after the first parent node configures the communication resource for the subnode, the resource indication information is used to notify the second parent node of the communication resource configured by the first parent node for the subnode, so that the communication resource configured by the second parent node for the subnode may not overlap the communication resource configured by the first parent node for the subnode.

In some embodiments, when the first communication resource includes a time resource, the resource indication information may further include a subnode identifier (ID) and a time pattern. The subnode identifier is used to identify the subnode. The subnode identifier is unique, that is, subnode identifiers of different subnodes are different. The time pattern is used to indicate a start time of the time window. For example, when the time resource indicates only duration and distribution of a time, a specific time of the time window can be determined with reference to the time window and the time pattern. For example, if the time window is a time of 20 minutes and the time pattern indicates that the start time of the time window is 10:00 AM, the specific time of the time window is from 10:00 AM to 10:20 AM.

In some embodiments, the first parent node may further receive node information of the second parent node from the subnode before sending, to the second parent node, the resource indication information used to indicate the first communication resource. The node information includes a node identifier, and the node identifier is a node identifier of the second parent node.

The node information of the second parent node is broadcasted by the second parent node, so that the subnode obtains the node information of the second parent node.

In some embodiments, the node information may further include resource occupancy information. The resource occupancy information is used to indicate a status of an occupied resource of the node. Specifically, the resource occupancy information may include load information.

In an actual communication process, the subnode may disconnect from the first parent node due to a link error and other reasons. The subnode needs to select and access a new parent node (such as the second parent node) as soon as possible. After receiving the node information of the second parent node, the first parent node may notify the second parent node of the first communication resource as soon as possible according to the node information by using the resource indication information, so that the second parent node can configure or reserve the second communication resource for the subnode in advance, to ensure that the subnode can quickly access the second parent node.

Figure 3:
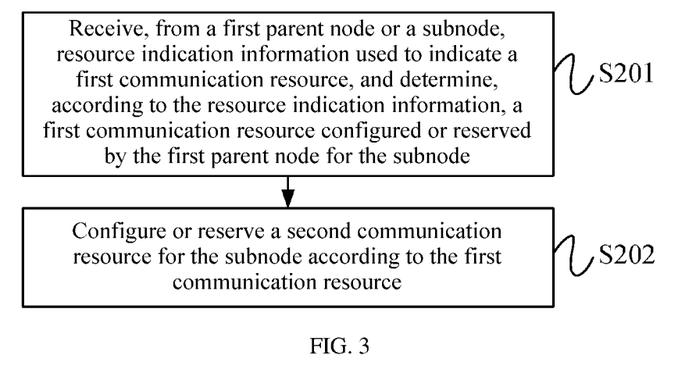
FIG. 3 is another flowchart of a resource allocation method according to an embodiment of the present disclosure.

FIG. 3 is another flowchart of a resource allocation method according to an embodiment of the present disclosure. The resource allocation method is performed by a second parent node. As shown in FIG. 3, the resource allocation method may include step S201 and step S202.

Step S201. Receive, from a first parent node or a subnode, resource indication information used to indicate a first communication resource, and determine, according to the resource indication information, a first communication resource configured or reserved by the first parent node for the subnode.

It should be noted that the resource indication information may be from the first parent node. That is, after configuring or reserving the first communication resource for the subnode, the first parent node may generate the resource indication information according to the first communication resource, and send the resource indication information to the second parent node.

Alternatively, the resource indication information may be from the subnode. That is, after the first parent node configures or reserves the first communication resource for the subnode and the subnode learns of the first communication resource, the subnode may generate the resource indication information according to the first communication resource, and send the resource indication information to the second parent node.

Step S202. Configure or reserve a second communication resource for the subnode according to the first communication resource.

For related descriptions of the first communication resource, the second communication resource, and the resource indication information in step S201 and step S202, refer to related content in the foregoing embodiments. Details are not described herein again.

In this embodiment of the present disclosure, the second parent node configures or reserves the second communication resource for the subnode according to the first communication resource indicated by the received resource indication information. That is, the second parent node configures or reserves the second communication resource for the subnode by considering the first communication resource. Therefore, this reduces interference between radio signals transmitted by a plurality of nodes, thereby improving communication quality.

In some embodiments, before a preset time period that is before a time resource configured by the first parent node for the subnode comes, the second parent node receives the resource indication information from the first parent node or the subnode. This reduces or avoids the impact of a backhaul delay or an internal processing delay of the subnode. The backhaul delay may be evaluated by the parent node and/or the subnode. The internal processing delay of the subnode may be evaluated by the subnode.

For relevant descriptions of the preset time period, refer to relevant content in the foregoing embodiments. Details are not described herein again.

In some embodiments, before the second parent node receives, from the first parent node or the subnode, the resource indication information used to indicate the first communication resource, the second parent node broadcasts node information of the second parent node. In this way, the subnode may send the node information of the second parent node to the first parent node, so that the second parent node and the first parent node exchange information, and the second parent node may configure or reserve the second communication resource for the subnode according to the first communication resource. In this way, the subnode quickly accesses the second parent node.

For other related descriptions of broadcasting the node information by the second parent node, refer to related content in the foregoing embodiments. Details are not described herein again.

Figure 4:
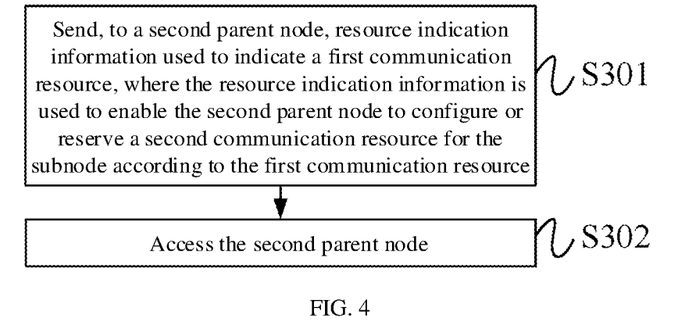
FIG. 4 is still another flowchart of a resource allocation method according to an embodiment of the present disclosure.

FIG. 4 is a flowchart of a resource allocation method according to another embodiment of the present disclosure. The resource allocation method is performed by a subnode. As shown in FIG. 4, the resource allocation method may include step S301 and step S302.

Step S301. Send, to a second parent node, resource indication information used to indicate a first communication resource, where the resource indication information is used to enable the second parent node to configure or reserve a second communication resource for the subnode according to the first communication resource.

The first communication resource is configured or reserved by the first parent node for the subnode.

Step S302. Access the second parent node.

For related descriptions of the first communication resource, the second communication resource, and the resource indication information in step S301 and step S302, refer to related content in the foregoing embodiments. Details are not described herein again.

In this embodiment of the present disclosure, the subnode sends, to the second parent node, the resource indication information used to indicate the first communication resource, so that the second parent node configures or reserves the second communication resource for the subnode according to the first communication resource. That is, the second parent node configures or reserves the second communication resource for the subnode by considering the first communication resource. Therefore, this reduces interference between radio signals transmitted by a plurality of nodes, thereby improving communication quality.

In some embodiments, before a preset time period that is before a time resource configured by the first parent node for the subnode comes, the subnode sends the resource indication information to the second parent node. This reduces or avoids the impact of a backhaul delay or an internal processing delay of the subnode. The backhaul delay may be evaluated by the parent node and/or the subnode. The internal processing delay of the subnode may be evaluated by the subnode.

For relevant descriptions of the preset time period, refer to relevant content in the foregoing embodiments. Details are not described herein again.

In some embodiments, before the subnode sends, to the second parent node, the resource indication information used to indicate the first communication resource, the subnode obtains the node information broadcast by the second parent node. The subnode sends the node information of the second parent node to the first parent node, so that the second parent node and the first parent node exchange information, and the second parent node may configure or reserve the second communication resource for the subnode according to the first communication resource. In this way, the subnode quickly accesses the second parent node.

For other related descriptions of broadcasting the node information by the second parent node, refer to related content in the foregoing embodiments. Details are not described herein again.

Figure 5:
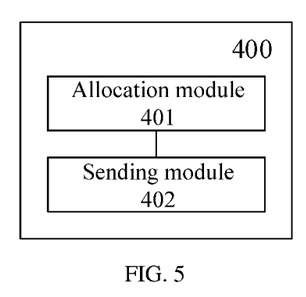
FIG. 5 is a schematic structural diagram of a parent node according to an embodiment of the present disclosure.

FIG. 5 is a schematic structural diagram of a parent node according to an embodiment of the present disclosure. As shown in FIG. 5, the parent node 400 can include an allocation module 401 and a sending module 402.

The allocation module 401 is configured to configure or reserve a first communication resource for a subnode.

The sending module 402 is configured to send, to another parent node, resource indication information used to indicate the first communication resource, where the resource indication information is used to enable the another parent node to configure or reserve a second communication resource for the subnode according to the first communication resource.

In this embodiment of the present disclosure, after configuring or reserving the first communication resource for the subnode, the parent node notifies the another parent node of the first communication resource by using the resource indication information, so that the another parent node configures or reserves the second communication resource for the subnode by considering the first communication resource. Therefore, this reduces interference between radio signals transmitted by a plurality of nodes, thereby improving communication quality.

In some embodiments, an intersection set of the first communication resource and the second communication resource is an empty set, or there is no interference between the first communication resource and the second communication resource.

In some embodiments, the first communication resource and the second communication resource both include a time resource, and/or the first communication resource and the second communication resource both include a band resource.

In some embodiments, the subnode is a relay node, the first communication resource and the second communication resource both include a time resource, and the time resource includes a backhaul time resource. The backhaul time resource includes an uplink backhaul time resource and a downlink backhaul time resource within a time window.

In some embodiments, the sending module 402 may be specifically configured to: before a preset time period that is before a time resource configured by the allocation module 401 for the subnode comes, send the resource indication information to the second parent node.

In some embodiments, the subnode is a terminal, the first communication resource and the second communication resource both include a time resource, and the time resource includes an access time resource. The access time resource includes an uplink access time resource and a downlink access time resource within a time window.

In some embodiments, the uplink access time resource and the downlink access time resource are non-backhaul time resources in the time window, and an intersection set of the uplink access time resource and the downlink access time resource is an empty set.

In some embodiments, the resource indication information further includes a subnode identifier and a time pattern, and the time pattern is used to indicate a start time of the time window.

In some embodiments, the parent node 400 may include a receiving module.

The receiving module is configured to receive node information of another parent node from the subnode. The node information includes a node identifier, and the node identifier is a node identifier of the another parent node.

Correspondingly, the sending module 402 is specifically configured to send, to the another parent node according to the node information of the another parent node, the resource indication information used to indicate the first communication resource.

The node information of the another parent node is broadcast by the another parent node, so that the subnode obtains the node information of the another parent node.

In some embodiments, the node information may further include resource occupancy information. The resource occupancy information is used to indicate a status of an occupied resource of the node. Specifically, the resource occupancy information may include load information.

Figure 6:
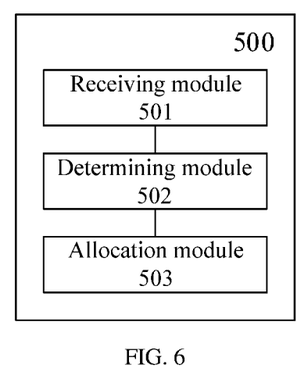
FIG. 6 is a schematic structural diagram of a parent node according to an embodiment of the present disclosure.

FIG. 6 is a schematic structural diagram of another parent node according to an embodiment of the present disclosure. As shown in FIG. 6, the parent node 500 can include a receiving module 501, a determining module 502, and an allocation module 503.

The receiving module 501 is configured to receive, from another parent node or a subnode, resource indication information used to indicate a first communication resource.

The determining module 502 is configured to: determine, according to the resource indication information, the first communication resource configured or reserved by the another parent node for the subnode.

The allocation module 503 is configured to configure or reserve a second communication resource for the subnode according to the first communication resource.

In this embodiment of the present disclosure, the parent node configures or reserves the second communication resource for the subnode according to the first communication resource indicated by the received resource indication information. That is, the parent node configures or reserves the second communication resource for the subnode by considering the first communication resource. Therefore, this reduces interference between radio signals transmitted by a plurality of nodes, thereby improving communication quality.

In some embodiments, an intersection set of the first communication resource and the second communication resource is an empty set, or there is no interference between the first communication resource and the second communication resource.

In some embodiments, the first communication resource and the second communication resource both include a time resource, and/or the first communication resource and the second communication resource both include a band resource.

In some embodiments, the subnode is a relay node, the first communication resource and the second communication resource both include a time resource, and the time resource includes a backhaul time resource. The backhaul time resource includes an uplink backhaul time resource and a downlink backhaul time resource within a time window.

In some embodiments, the receiving module 501 may be specifically configured to: before a preset time period that is before a time resource configured by the another parent node for the subnode comes, receive the resource indication information from the another parent node or the subnode.

In some embodiments, the subnode is a terminal, the first communication resource and the second communication resource both include a time resource, and the time resource includes an access time resource. The access time resource includes an uplink access time resource and a downlink access time resource within a time window.

In some embodiments, the uplink access time resource and the downlink access time resource are non-backhaul time resources in the time window, and an intersection set of the uplink access time resource and the downlink access time resource is an empty set.

In some embodiments, the resource indication information further includes a subnode identifier and a time pattern, and the time pattern is used to indicate a start time of the time window.

In some embodiments, the parent node 500 may include a broadcasting module.

The broadcasting module is configured to broadcast node information of the parent node 500, so that the subnode may send the node information of the parent node 500 to the another parent node, and the another parent node sends the resource indication information to the parent node 500 according to the node information of the parent node 500.

Figure 7:
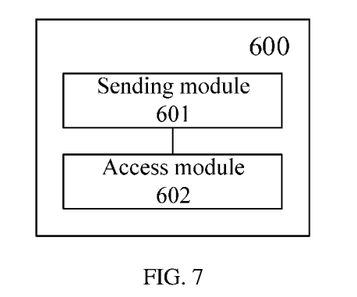
FIG. 7 is a schematic structural diagram of a subnode according to an embodiment of the present disclosure.

FIG. 7 is a schematic structural diagram of a subnode according to an embodiment of the present disclosure. As shown in FIG. 7, the subnode 600 may include: a sending module 601 and an access module 602.

The sending module 601 is configured to send, to a second parent node, resource indication information used to indicate a first communication resource, where the resource indication information is used to enable the second parent node to configure or reserve a second communication resource for the subnode according to the first communication resource.

The first communication resource is configured or reserved by a first parent node for the subnode.

The access module 602 is configured to access the second parent node.

In this embodiment of the present disclosure, the subnode sends, to the second parent node, the resource indication information used to indicate the first communication resource, so that the second parent node configures or reserves the second communication resource for the subnode according to the first communication resource. That is, the second parent node configures or reserves the second communication resource for the subnode by considering the first communication resource. Therefore, this reduces interference between radio signals transmitted by a plurality of nodes, thereby improving communication quality.

In some embodiments, an intersection set of the first communication resource and the second communication resource is an empty set, or there is no interference between the first communication resource and the second communication resource.

In some embodiments, the first communication resource and the second communication resource both include a time resource, and/or the first communication resource and the second communication resource both include a band resource.

In some embodiments, the subnode is a relay node, the first communication resource and the second communication resource both include a time resource, and the time resource includes a backhaul time resource. The backhaul time resource includes an uplink backhaul time resource and a downlink backhaul time resource within a time window.

In some embodiments, the sending module 602 may be specifically configured to: before a preset time period that is before a time resource configured by the first parent node for the subnode comes, send the resource indication information to the second parent node.

In some embodiments, the subnode is a terminal, the first communication resource and the second communication resource both include a time resource, and the time resource includes an access time resource. The access time resource includes an uplink access time resource and a downlink access time resource within a time window.

In some embodiments, the uplink access time resource and the downlink access time resource are non-backhaul time resources in the time window, and an intersection set of the uplink access time resource and the downlink access time resource is an empty set.

In some embodiments, the resource indication information further includes a subnode identifier and a time pattern, and the time pattern is used to indicate a start time of the time window.

In some embodiments, the subnode 600 may include an obtaining module.

The obtaining module is configured to obtain node information broadcast by the second parent node.

Correspondingly, the sending module 601 is specifically configured to send, to the second parent node according to the node information broadcast by the second parent node, the resource indication information used to indicate the first communication resource.

An embodiment of the present disclosure further provides a parent node. The parent node may include a memory and a processor. The memory stores a computer program. When the computer program is executed by the processor, the resource allocation method applied to the first parent node in the foregoing embodiment may be controlled.

Figure 8:
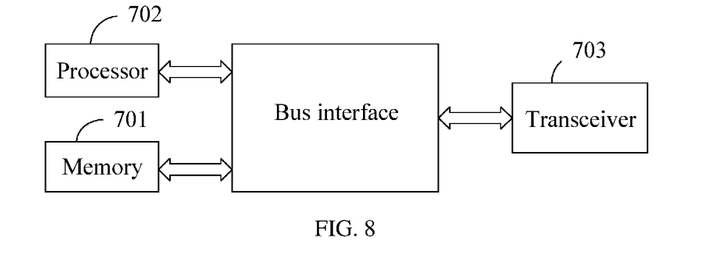
FIG. 8 is a schematic diagram of a hardware structure of a parent node according to an embodiment of the present disclosure.

For example, FIG. 8 is a schematic diagram of a hardware structure of a parent node according to an embodiment of the present disclosure. As shown in FIG. 8, the parent node may include: a memory 701, a processor 702, a transceiver 703, and a computer program stored in the memory 701 and executable on the processor 702.

The processor 702 is configured to configure or reserve a first communication resource for a subnode.

The transceiver 703 is configured to send, to a second parent node, resource indication information used to indicate the first communication resource, where the resource indication information is used to enable the second parent node to configure or reserve a second communication resource for the subnode according to the first communication resource.

In some embodiments, an intersection set of the first communication resource and the second communication resource is an empty set, or there is no interference between the first communication resource and the second communication resource.

In some embodiments, the first communication resource and the second communication resource both include a time resource, and/or the first communication resource and the second communication resource both include a band resource.

In some embodiments, the subnode is a relay node, the first communication resource and the second communication resource both include a time resource, and the time resource includes a backhaul time resource. The backhaul time resource includes an uplink backhaul time resource and a downlink backhaul time resource within a time window.

In some embodiments, the transceiver 703 is configured to: before a preset time period that is before a time resource configured by the another parent node for the subnode comes, receive the resource indication information from the another parent node or the subnode In some embodiments, the subnode is a terminal, the first communication resource and the second communication resource both include a time resource, and the time resource includes an access time resource. The access time resource includes an uplink access time resource and a downlink access time resource within a time window.

In some embodiments, the uplink access time resource and the downlink access time resource are non-backhaul time resources in the time window, and an intersection set of the uplink access time resource and the downlink access time resource is an empty set.

In some embodiments, the resource indication information further includes a subnode identifier and a time pattern, and the time pattern is used to indicate a start time of the time window.

In FIG. 8, a bus architecture may include any quantity of interconnected buses and bridges, which are specifically connected by various circuits of one or more processors represented by the processor 702 and a memory represented by the memory 701. The bus architecture may further connect various other circuits of a peripheral device, a voltage stabilizer, a power management circuit, and the like. These are all well-known in the art and are not further described again in this specification. The bus interface provides an interface. The transceiver 703 may include a plurality of elements, that is, include a signal transmitter and a signal receiver, provides a unit for communication with various other apparatuses on a transmission medium, and is configured to receive and send data under control of the processor 702. The processor 702 is responsible for management of the bus architecture and general processing. The memory 701 can store data used by the processor 702 during operation execution.

An embodiment of the present disclosure further provides a parent node. The parent node may include a memory and a processor. The memory stores a computer program. When the computer program is executed by the processor, the resource allocation method applied to the second parent node in the foregoing embodiment may be controlled.

The hardware structure of the parent node 800 is similar to that shown in FIG. 8. Refer to the hardware structure shown in FIG. 8. The parent node may include a memory 801, a processor 802, a transceiver 803, and a computer program stored in the memory 801 and executable on the processor 802.

The transceiver 803 is configured to receive, from another parent node or a subnode, resource indication information used to indicate a first communication resource.

The processor 802 is configured to: determine, according to the resource indication information, the first communication resource configured or reserved by the another parent node for the subnode.

The processor 802 is further configured to configure or reserve a second communication resource for the subnode according to the first communication resource.

In some embodiments, an intersection set of the first communication resource and the second communication resource is an empty set, or there is no interference between the first communication resource and the second communication resource.

In some embodiments, the first communication resource and the second communication resource both include a time resource, and/or the first communication resource and the second communication resource both include a band resource.

In some embodiments, the subnode is a relay node, the first communication resource and the second communication resource both include a time resource, and the time resource includes a backhaul time resource. The backhaul time resource includes an uplink backhaul time resource and a downlink backhaul time resource within a time window.

In some embodiments, the transceiver 803 is configured to: before a preset time period that is before a time resource configured by the another parent node for the subnode comes, receive the resource indication information from the another parent node or the subnode In some embodiments, the subnode is a terminal, the first communication resource and the second communication resource both include a time resource, and the time resource includes an access time resource. The access time resource includes an uplink access time resource and a downlink access time resource within a time window.

In some embodiments, the uplink access time resource and the downlink access time resource are non-backhaul time resources in the time window, and an intersection set of the uplink access time resource and the downlink access time resource is an empty set.

In some embodiments, the resource indication information further includes a subnode identifier and a time pattern, and the time pattern is used to indicate a start time of the time window.

For a bus architecture and a bus interface, refer to relevant descriptions in the foregoing embodiments. Details are not described herein again.

An embodiment of the present disclosure further provides a subnode. The subnode may include a memory and a processor. The memory stores a computer program. When the computer program is executed by the processor, the resource allocation method applied to the subnode in the foregoing embodiment may be performed.

The hardware structure of the parent node 900 is similar to that shown in FIG. 8. Refer to the hardware structure shown in FIG. 8. The subnode may include a memory 901, a processor 902, a transceiver 903, and a computer program stored in the memory 901 and executable on the processor 902.

The transceiver 903 is configured to send, to a second parent node, resource indication information used to indicate a first communication resource, where the resource indication information is used to enable the second parent node to configure or reserve a second communication resource for the subnode according to the first communication resource.

The processor 902 is configured to access the second parent node.

In some embodiments, an intersection set of the first communication resource and the second communication resource is an empty set, or there is no interference between the first communication resource and the second communication resource.

In some embodiments, the first communication resource and the second communication resource both include a time resource, and/or the first communication resource and the second communication resource both include a band resource.

In some embodiments, the subnode is a relay node, the first communication resource and the second communication resource both include a time resource, and the time resource includes a backhaul time resource. The backhaul time resource includes an uplink backhaul time resource and a downlink backhaul time resource within a time window.

In some embodiments, before a preset time period that is before a time resource configured by the first parent node for the subnode comes, the resource indication information may be sent to the second parent node.

In some embodiments, the subnode is a terminal, the first communication resource and the second communication resource both include a time resource, and the time resource includes an access time resource. The access time resource includes an uplink access time resource and a downlink access time resource within a time window.

In some embodiments, the uplink access time resource and the downlink access time resource are non-backhaul time resources in the time window, and an intersection set of the uplink access time resource and the downlink access time resource is an empty set.

In some embodiments, the resource indication information further includes a subnode identifier and a time pattern, and the time pattern is used to indicate a start time of the time window.

For a bus architecture and a bus interface, refer to relevant descriptions in the foregoing embodiments. Details are not described herein again.

An embodiment of the present disclosure further provides a computer readable storage medium, where the computer readable storage medium stores a computer program. When the computer program is executed by a processor, processes of the resource allocation method are performed, and the same technical effects can be achieved. To avoid repetition, details are not described herein again. The computer readable storage medium is, for example, a read-only memory (ROM), a random access memory (RAM), a magnetic disk, or an optical disc.

It should be understood by a person skilled in the art that the foregoing embodiments are merely exemplary rather than restrictive. The present disclosure is not limited to the specific steps and structures described above and shown in the figures. A person skilled in the art can make various changes, modifications, and additions, or change the sequence between the steps after understanding the spirit of the present disclosure, to achieve the beneficial effects. On the basis of studying the accompanying drawings, the specification, and the claims, a person skilled in the art shall be able to understand and implement other modified embodiments of the disclosed embodiments. In the claims, the term "comprise" does not exclude other apparatuses or steps, the indefinite article "one" does not exclude a plurality of, and the terms "first" and "second" are used to indicate names rather than to indicate any particular order. None of the reference signs in the claims shall be construed as limiting the protection scope. A plurality of functions in the claims may be implemented by a single hardware or software module. The appearance of certain technical features in different dependent claims does not mean that these technical features cannot be combined to achieve beneficial effects.

It should be made clear that the embodiments in this specification are described in a progressive manner, and for the same or similar parts among the embodiments, refer to each other. Each embodiment focuses on a difference from other embodiments. For related parts of the embodiments of the parent nodes, the embodiments of the subnodes, and the embodiments of the computer readable storage mediums, refer to the descriptions of the embodiments of the methods.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of the claims, all of which fall within the protection of the present disclosure.

The invention claimed is:

1. A resource allocation method, comprising:
configuring or reserving, by a first parent node, a first communication resource for a child node; and
sending, by the first parent node to a second parent node, resource indication information used to indicate the first communication resource, wherein the resource indication information is used to enable the second parent node to configure or reserve a second communication resource for the child node according to the first communication resource,
wherein the child node is a relay node, the first communication resource and the second communication resource both comprise a time resource, and the time resource comprises a backhaul time resource; and the backhaul time resource comprises an uplink backhaul time resource and a downlink backhaul time resource within a time window.

2. The method according to claim 1, wherein an intersection set of the first communication resource and the second communication resource is an empty set, or there is no interference between the first communication resource and the second communication resource.

3. The method according to claim 1, wherein
the first communication resource and the second communication resource both comprise a band resource.

4. The method according to claim 1, wherein the sending, by the first parent node to a second parent node, resource indication information used to indicate the first communication resource comprises:
before a preset time period that is before a time resource configured by the first parent node for the child node comes, sending, by the first parent node, the resource indication information to the second parent node.

5. The method according to claim 1, wherein the resource indication information further comprises a child node identifier and a time pattern, and the time pattern is used to indicate a start time of the time window.

6. A parent node, comprising a processor and a memory, wherein the memory stores a computer program, and when the computer program is executed by the processor, the processor is configured to perform steps of the resource allocation method according to claim 1.

7. A resource allocation method, comprising:
receiving, by a second parent node from a first parent node or a child node, resource indication information used to indicate a first communication resource, and determining, according to the resource indication information, a first communication resource configured or reserved by the first parent node for the child node; and
configuring or reserving, by the second parent node, a second communication resource for the child node according to the first communication resource,
wherein the child node is a relay node, the first communication resource and the second communication resource both comprise a time resource, and the time resource comprises a backhaul time resource; and the backhaul time resource comprises an uplink backhaul time resource and a downlink backhaul time resource within a time window.

8. The method according to claim 7, wherein the receiving, by a second parent node from a first parent node or a child node, resource indication information used to indicate a first communication resource comprises:

before a preset time period that is before a time resource configured by the first parent node for the child node comes, receiving, by the second parent node, the resource indication information from the first parent node or the child node.

9. A parent node, comprising a processor and a memory, wherein the memory stores a computer program, and when the computer program is executed by the processor, the processor is configured to perform steps of the resource allocation method according to claim 7.

10. A resource allocation method, comprising:

sending, by a child node to a second parent node, resource indication information used to indicate a first communication resource, wherein the resource indication information is used to enable the second parent node to configure or reserve a second communication resource for the child node according to the first communication resource, where the first communication resource is configured or reserved by a first parent node for the child node; and accessing, by the child node, the second parent node, wherein the child node is a relay node, the first communication resource and the second communication resource both comprise a time resource, and the time resource comprises a backhaul time resource; and the backhaul time resource comprises an uplink backhaul time resource and a downlink backhaul time resource within a time window.

11. A child node, comprising a processor and a memory, wherein the memory stores a computer program, and when the computer program is executed by the processor, the processor is configured to perform steps of the resource allocation method according to claim 10.

* * * * *